United States Patent Office 3,467,888
Patented Sept. 16, 1969

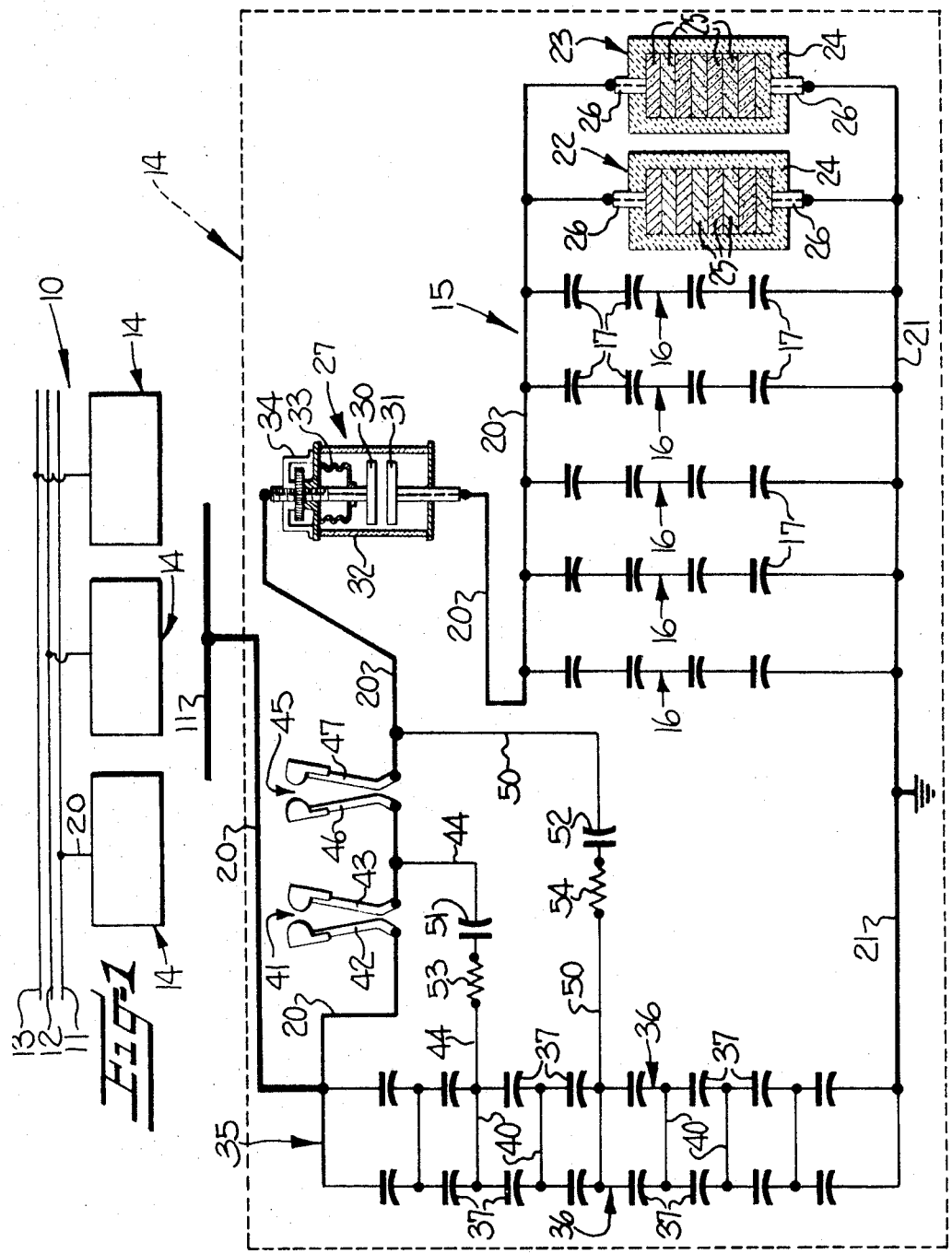

3,467,888
CAPACITOR BANK SURGE PROTECTION DEVICE
Herman B. Wolf, 1917 Beverly Drive,
Charlotte, N.C. 28207
Filed Jan. 6, 1967, Ser. No. 607,821
Int. Cl. H02h 7/16
U.S. Cl. 317—12     10 Claims

ABSTRACT OF THE DISCLOSURE

A surge limiting device having one bank of capacitors continuously connected between bus and ground, and a series of arc gaps arranged to spark over at surge voltage in the bus and connect a second bank of capacitors in shunting parallel relation to the first bank of capacitors for so long as the surge voltage persists.

---

The present invention relates to a surge limiting device for use in an alternating current electrical power transmission system for absorbing the electrical energy of a surge substantially in excess of normal line-to-ground voltage on a bus line of the system and thereby limiting the surge voltage to a predetermined maximum value.

A high voltage bus line must not only safely carry its normal voltage, but must also be designed so as to avoid destructive impact upon itself and connected equipment when a surge voltage in substantial excess of the normal voltage is impressed upon the line. Such surges are caused by various phenomena, such as lightning strokes and bound charges resulting when circuits are suddenly removed from or added onto the system circuit. Such surges cannot be entirely avoided, and must therefore be dealt with, which heretofore has been done by providing normally inactive arresters at critical points connected between the bus line and ground and a very high BIL (basic insulation level) for both the bus line and its connected equipment.

Such arresters are adapted to spark-over and become active upon the impressment thereon of a surge voltage substantially higher than the normal line-to-ground voltage on the bus line, and when active, such arresters divert the surge voltage to ground where the energy thereof is absorbed. The most effective and commonly used type of such arresters include a series of silicon-carbide blocks in series with small arc gaps set to spark-over at a surge voltage of a predetermined value above normal line-to-ground voltage on the bus line. The silicon-carbine blocks have the characteristic of decreasing in electrical resistance as current flows therethrough. Therefore, the voltage spark-over setting of the arc gaps of the arrester must be abnormally high, relative to normal voltage on the bus line, so that the resistance of the silicon-carbide blocks will still be sufficiently high after surge current has flowed therethrough to inactivate the arrester upon a return to normal voltage on the bus line. Accordingly, the bus line and its connected equipment must be provided with a BIL adequate to protect the same from the abnormally high voltage at which the arrester will spark over.

It is additionally to be noted that, in the usual instance, a surge voltage builds up in a bus line at an extremely rapid rate and will reach the voltage spark-over value to which the arrester is set in a fraction of a microsecond. Heretofore, arresters have exerted no temporizing effect upon the surge voltage until it has increased to the voltage spark-over value of the arc gaps in the arrester. Because of the virtually vertical slope of the surge voltage build-up curve and other factors, spark-over of the arrester initially provides only a very limited zone of protection, measured in terms of a few feet from the arrester. At points outside this limited zone of protection, the surge voltage build-up may continue for several microseconds despite the arrester having sparked over, and the voltage at these points may thus attain a value considerably above the voltage at which the arrester sparked over. Moreover, the sudden activation of the arrester causes an instantaneous stop and reversal of the voltage rise at the arrester and to the circuit connected to the arrester. As a result of this "chopping action," a surge of voltage may be induced on any low voltage line which may be coupled to the high voltage bus line, e.g. through transformer winding capacitance. Therefore, the bus line and the equipment connected thereto must be provided with a BIL adequate to not only protect the same from the abnormally high voltage at which the arrester will spark over, but also from a voltage considerably in excess of this spark-over voltage due to further voltage rise after arrester activation.

The disadvantages of such high level BIL are well known and include economic considerations, since BIL is usually provided in distinct levels and each level increase in the BIL of a bus line and its connected equipment adds 5% to 7% to the cost thereof. Additionally, the efficiency of the system including the bus line and its connected equipment decreases as the BIL thereof is increased.

It is therefore an object of the present invention to provide a surge limiting device for use with a high voltage bus line and wherein surge voltage in the bus line is limited to a lower, more reasonable value above normal line-to-ground voltage on the bus line than has heretofore been possible with conventional protection equipment so that the BIL of the bus line and any connected equipment may be safely reduced to consequently reduce the cost and increase the efficiency thereof.

A more specific object of the present invention is to provide a surge limiting device of the character described wherein the rate of increase of voltage on the bus line upon the appearance of a surge is decreased to increase the zone of protection afforded to the bus line and its connected equipment by the surge limiting device over that possible with previous protection equipment.

Some of the objects of the invention having been stated, other objects will appear as the description proceeds, when taken in connection with the accompanying drawings, in which—

FIGURE 1 is a diagrammatic view of an electrical power transmission system protected against voltage surges by a plurality of surge limiting devices according to the present invention; and FIGURE 2 is an enlarged schematic view illustrating the structure of a surge limiting device according to the invention, which structure is represented by each of the rectangular blocks in FIGURE 1.

Referring more specifically to the drawings and initially to FIGURE 1 thereof, an exemplary electrical power transmission system 10, which may be either single phase or polyphase, is shown as a three phase system including bus lines 11, 12 and 13. Each of the bus lines 11, 12, 13 has impressed thereon a normal line-to-ground voltage from a source (not shown).

Surge limiting devices, generally designated at 14, are provided in system 10, one such device 14 being connected between each of the bus lines 11, 12, 13 and ground. Each surge limiting device 14 is responsive to an increase in line-to-ground voltage on the associated bus line to a predetermined value above normal line-to-ground voltage thereon for limiting the maximum value of line-to-ground voltage on the associated bus line substantially to this predetermined value, but substantially below that permitted by the voltage limiting arrangements heretofore known. As a result, the BIL (basic insulation level) of the associated bus line and the equipment connected thereto may be one or more levels below that formerly required, while providing a protection ratio (BIL, expressed as voltage, divided by the predetermined maximum voltage on the bus line) as good as or better than that provided by conventional arrangements.

One surge limiting device 14 is illustrated in FIGURE 2 as connected between bus line 11 and ground, and will now be described. In order to limit surge voltage on the bus line 11 to the aforementioned predetermined maximum value above the normal line-to-ground voltage thereon, surge limiting device 14 includes a bank of capacitors 15 for absorbing electrical energy from a surge voltage on bus line 11 of a voltage value equal to or higher than the aforesaid predetermined value.

Capacitor bank 15 includes at least one string 16 of series-connected capacitors 17. Preferably, a plurality of capacitor strings 16 are provided and connected in parallel with each other by a line 20 connected to bus line 11 and a line 21 connected to ground, there being five such capacitor strings 16 in the illustrated embodiment. Each capacitor string 16 includes a plurality of capacitors 17, with the number of capacitors 17 in each string being such that the voltage impressed on each capacitor 17 does not exceed the short time rating, or capability, thereof during the short time between the application of the surge and the interruption of current flow after normal voltage conditions have been restored. The number of strings 16 are correlated to the surge energy which may appear on bus line 11 to provide the necessary energy absorption capacity required for the particular bus line to which the capacitors are connected.

The number of capacitors 17 in each string 16 is determined by dividing the normal line-to-ground voltage by the short time voltage rating of a capacitor unit. A proper short time rating for this application is two times the continuous rating.

A safe surge voltage rating of a capacitor unit 17 is four times the crest voltage of the continuous rating. Then the surge energy absorbing capability of one capacitor unit 17 at the predetermined surge voltage value expressed in coulombs is: rated continuous voltage times 1.41 (to obtain crest voltage) times 4 (surge voltage rating) times microfarad rating of each unit 17.

Since the ratio of surge voltage impressed on the string 16 to the surge voltage impressed on each capacitor unit 17 times the units in the string is 1, the surge-absorbing ability of the string in coulombs is equal to the surge-absorbing ability of one unit 17.

Then to obtain the number of parallel strings to absorb a predetermined maximum coulomb charge, we divide the predetermined maximum charge by the coulomb charge in one string.

For best results, surge limiting device 14 includes means for dissipating energy, absorbed by the capacitor bank 15 during a surge, after the surge has terminated, and preferably this means comprises at least one silicon-carbide resistor connected in parallel to capacitor bank 15. In the illustrated embodiment, two such resistors 22, 23 are connected in parallel with each other and capacitor bank 15 between lines 20 and 21 and each such resistor includes a suitable moisture-proof electrical insulating (e.g. porcelain) housing 24 and a plurality of stacked silicon-carbide blocks 25 in intimate contact with each other and the distal blocks being in intimate contact with terminal posts 26. While these resistors will dissipate stored energy from the capacitors 17, they will also absorb energy during the surge and will thereby aid the capacitor bank 15 in limiting the value of surge voltage.

In order that capactior bank 15 and resistors 22, 23 will be connected between bus line 11 and ground only when the voltage on bus line 11 is of a predetermined value above its normal line-to-ground voltage, means is interposed between capacitor bank 15 and bus line 11 which is set to be responsive to an increase in voltage on bus line 11 to a surge voltage of the aforesaid predetermined value or higher for completing the connection of capacitor bank 15 between bus line 11 and ground. Preferably, this means includes an arc gap 27 interposed in line 20 between bus line 11 and capacitor bank 15.

As illustrated, arc gap 27 is defined by a pair of spaced electrodes 30, 31 which are mounted for relative adjustment to vary the space therebetween to calibrate arc gap 27 for any desired voltage spark-over value which is higher by a predetermined amount than the normal line-to-ground voltage impressed on bus line 11. In order that this voltage spark-over value need not be set abnormally higher than the normal line-to-ground voltage on bus line 11, arc gap 27 is preferably of the vacuum type and, to this end, electrodes 30, 31 are encased in a hollow air-tight housing 32 from which a considerable portion of the air has been evacuated. Electrode 30 enters housing 32 through one end thereof and is supported therein by an air-tight resilient means, such as a bellows 33. Accordingly, electrode 30 may move relative to housing 32 to permit proper spark-over setting between electrodes 30 and 31 without disrupting the air-tightness of housing 32. To effect this adjustment, electrode 30 is adjustably mounted within housing 32 by any suitable means, such as a thumb screw arrangement 34.

Electrode 31 is suitably mounted on the other end of housing 32, as by being welded thereto. In this respect, the ends of housing 32 are preferably of metal and the sides are of glass soldered to the metal ends for insulating the electrodes 30, 31 from each other.

Because of the vacuum within housing 32, spark-over of the vacuum arc gap 27 and thus current flow between electrodes 30, 31 does not result in the creation of an ionized path of appreciably lower resistance than is normally provided by the spacing between electrodes 30, 31. Consequently, there is no substantial variation in the electrical resistance of vacuum arc gap 27 and, following a surge and spark-over of arc gap 27, when the voltage across the arc gap 27 falls below the voltage spark-over value thereof, the arc gap 27 will no longer conduct current, but will instead extinguish the arc thereacross, thereby cutting off the flow of current between bus line 11 and capacitor bank 15.

In order to slow the rate of voltage changes on bus line 11 and to provide power factor correction to the current flowing therein, a surge limiting device 14 also includes an additional bank of capacitors 35 connected to bus line 11 by line 20 and to a ground by line 21. Additional capacitor bank 35 preferably comprises at least one string 36 comprising a plurality of series-connected capacitors 37. In the illustrated embodiment, two such capacitor strings 36 are shown connected in parallel to each other within the capacitor bank 35 and each of which includes eight capacitors 37 therewithin. Where more than one capacitor string 36 is provided, it is preferable to cross-connect the capacitor strings in parallel between each adjacent pair of capacitors in each string, as by lines 40. This parallel cross-connection aids in equalizing and balancing the energy-absorbing effects of capacitors 37 throughout capacitor bank 35.

The number of capacitors 37 in bank 35 will depend upon the amount of power factor correction and voltage stabilization to be provided thereby and this number will be determined in like manner to the number of capacitors in bank 15. This number of capacitors in each string 36 is determined by dividing the normal line-to-ground voltage by the continuous voltage rating of each capacitor unit 37. The ratio of the predetermined maximum surge voltage divided by the rated continuous crest voltage times rated continuous voltage times 1.41 (to obtain crest voltage) times microfarads (in each capacitor 37) gives the surge energy absorbing capability of one string 36 in coulombs. To obtain the number of strings in 35 we divide desired coulombs absorbing capability by coulomb rating of one string.

As set forth hereinabove, surge limiting device 14 permits maintenance of a relatively low ratio between the value of the maximum surge voltage ($V_m$) to be permitted on bus line 11 and the value of the normal voltage ($V_n$) thereon. It is therefore important that the means for connecting capacitor bank 15 to bus line 11 in response to a voltage thereon of the aforesaid predetermined value be very accurately calibrated to make such connection once the voltage on bus line 11 has in fact attained this value, and to disconnect capacitor bank 15 from bus line 11 when a normal voltage condition is restored on bus line 11.

If vacuum arc gap 27 were directly interposed between bus line 11 and capacitor bank 15 and, with capacitor bank 15, were connected across the full capacitor bank 35, it would have full line-to-ground voltage impressed thereacross under both normal operating and surge conditions. This arrangement would be serviceable for many electrical systems, and is included in the present invention. In addition, the present invention is primarily, but not exclusively, concerned with high voltage transmission systems, such as 110 kv. or higher, and with such systems, the very high voltages make accurate calibration of vacuum arc gap 27 to the degree required by the very low $V_m/V_n$ ratio most difficult since a relatively small percentage of error in the calibration of vacuum arc gap 27 will result in a substantial difference in actual voltage value of its voltage spark-over setting.

In order to provide the desired precision in calibratior of surge limiting device 14, a trigger means is preferably interposed in line 20 and connected in parallel across only a proportionate part of capacitor bank 35 so that the voltage impressed across this trigger means is only a corresponding proportionate part of the line-to-ground voltage and so that the voltage impressed across vacuum arc gap 27 is reduced under normal voltage conditions by this proportionate part.

Preferably, this trigger means includes at least one trigger arc gap 41 defined by a pair of diverging, spaced apart electrodes 42, 43, connected in line 20 and which may be of any suitable construction, such as that described in my U.S. Patent No. 3,255,382. A line 44 connects arc gap 41 in shunting parallel relation to a proportionate part of capacitor bank 35. As illustrated, this connection is across one-fourth of capacitor bank 35 and therefore the voltage impressed across trigger arc gap 41 is of a value approximating one-fourth the line-to-ground voltage on bus line 11.

Electrodes 42, 43 are mounted for relative adjustment and are spaced apart a calibrated distance such that the voltage spark-over value of trigger arc gap 41 is a predetermined amount above the voltage impressed thereacross by normal voltage on bus line 11 which in accordance with the present invention may be as low as twice this normal voltage. Since the voltage impressed across trigegr arc gap 41 is but a proportionate part of the full line-to-ground voltage on bus line 11, it will be appreciated that trigger arc gap 41 can be calibrated with considerably more precision than would be the case if full line-to-ground voltage were impressed thereacross.

Preferably, the trigger means also includes at least one second, or backup, trigger arc gap 45 defined by a pair of diverging, spaced apart electrodes 46, 47, which may be similar to electrodes 42, 43. Electrodes 46, 47 are connected in line 20 in series with trigger arc gap 41 and between the same and vacuum arc gap 27, it being noted that line 44 is connected to line 20 between trigger arc gap 41 and second trigger arc gap 45. A line 50 connects second trigger arc gap 45 in shunting parallel relation across a proportionate part of capacitor bank 35 greater than and including the proportionate part thereof across which trigger arc gap 41 in connected. As illustrated, this greater proportionate part is one-half of the capacitor bank 35, but because of line 44, the voltage impressed across trigger arc gap 45, when trigger arc gap 41 is not conducting, is also of a value approximately one-fourth the line-to-ground voltage on bus line 11. However, when trigger arc gap 41 sparks over and becomes conductive, the voltage impressed across trigger arc gap 45 becomes approximately one-half the line-to-ground voltage on bus line 11.

Electrodes 46, 47 are mounted for relative adjustment and are spaced apart a slightly greater distance than the spacing between electrodes 42, 43 of trigger arc gap 41, so that the voltage spark-over value of trigger arc gap 45 is slightly higher, but less than double, the voltage spark-over value of trigger arc gap 41.

Preferably, coupling capacitors 51, 52 are connected in lines 44, 50, respectively, for stabilizing the voltages improssed across the respective arc gaps to further aid in accurate calibration thereof. Coupling capacitors 51, 52 each have normal voltage ratings approximately equal to the voltage impressed thereacross by the normal voltage on bus line 11. As will be appreciated, coupling capacitor 52 accordingly has a normal voltage rating approximately double that of coupling capacitor 51. Each of the coupling capacitors 51, 52 should have a low microfarad rating, and accordingly should be of relatively high impedance.

If desired, damping resistors 53, 54 also may be provided, each connected in series with a corresponding one of the coupling capacitors 51, 52 in the corresponding line 44 or 50. Damping resistors 53, 53 each serve to damp voltage oscillations between the corresponding pair of arc gaps and the corresponding adjacent pair of capacitors 37 in capacitor bank 35.

In operation, a normal line-to-ground voltage is impressed on bus line 11, and charges capacitors 37 in capacitors 37 in capacitor bank 35 to a level substantially attuned to this normal voltage. So long as the line-to-ground voltage on bus line 11 remains at this normal value, capacitors 37 in capacitor bank 35 will provide power factor correction for the current carried by bus line 11, and the arc gaps 41, 45, and 27 will remain as open circuits so that no current flows to capacitor bank 15.

Should some phenomena, such as a lightning stroke, etc., introduce a quantity of electrical energy to bus line 11 in excess of that expressed by the normal voltage thereon, the voltage on bus line 11 will begin to increase toward surge voltage proportions. Capacitors 37 in capacitor bank 35 will immediately respond to this voltage increase by absorbing electrical energy from bus line 11, and will slow the rate of such voltage increase. In most instances, capacitors 37 will absorb sufficient electrical energy from bus line 11 to prevent the voltage thereon from increasing to a value high enough to cause spark-over of the arc gaps 41, 45, 27, so that capacitor bank 15 will usually not be connected between bus line 11 and ground.

Assuming, however, that the quantity of electrical energy added to bus line 11 in this instance is larger than the absorptive capacity of the capacitors 37 in capacitor bank 35, the voltage on bus line 11 will continue to rise until it attains the aforesaid predetermined value, i.e., reaches surge voltage proportions. When this occurs, the voltage across trigger arc gap 41 will be at the spark-over voltage thereof and an arc will be established thereacross and current will then flow thereacross between electrodes 42 and 43. This establishes a low impedance path to trigger arc gap 45 and the voltage impressed across arc gap 45 will thereby immediately substantially double to a voltage above the voltage spark-over value thereof. An arc will thus be established across arc gap 45 and current will then flow between electrodes 46, 47 raising the voltage potential across vacuum arc gap 27 to substantially full line-to-ground surge voltage on bus line 11. Since this voltage potential is of the aforesaid predetermined surge value, it is at least equal to the voltage spark-over value of vacuum arc gap 27, and an arc will be established thereacross and current will therefore then flow between electrodes 30, 31, which current will be conducted through line 20 to capacitor bank 15. Capacitors 17 in capacitor bank 15 will then absorb electrical energy from bus line 11 at a rate sufficiently rapid to prevent substantially any further increase in the value of the voltage on bus line 11.

It should be noted that, with arc gaps 41, 45 and 27 all conducting, capacitor bank 15 is simultaneously connected through line 20 in shunting parallel relation to the capacitor bank 35, so that capacitors 17, 37 in both capacitor banks 15, 35 are simultaneously absorbing electrical energy from bus line 11. Therefore, even should the cause of the surge voltage continue for a substantial time period, all the capacitors 17 and 37 absorb electrical energy from bus line 11 and thus cooperate with each other to prevent further substantial increase in the voltage on bus line 11. It should also be noted that resistors 22, 23, being connected in parallel with capacitor bank 15, are also absorbing electrical energy from bus line 11, and thus are aiding the capacitors 17, 37 in preventing further voltage increase.

When the cause of the surge voltage is removed, continued absorption of electrical energy from the bus line 11 by the capacitors 17, 37 and resistors 22, 23 will cause the voltage on bus line 11 to rapidly decrease toward normal voltage. When this voltage has dropped to a value below the voltage spark-over value of vacuum arc gap 27, gap 27 will cease to conduct current, and thus will become an open circuit, disconnecting capacitor bank 15 from bus line 11. Similarly, arc gaps 41 and 45 will become inactive when a normal voltage condition is restored on bus line 11. Capacitor bank 35, however, is continuously connected between bus line 11 and ground, and the capacitors 37 therein will continue to absorb electrical energy from bus line 11 although a stable voltage condition approximating normal voltage is reached in bus line 11.

The capacitors 17 in capacitor bank 15 have, in the meantime, become heavily charged with electrical energy from the surge voltage. As soon as vacuum arc gap 27 ceases to conduct, the electrical energy absorbed by capacitors 17 will be immediately discharged therefrom through resistors 22, 23, from where it will be dissipated into the surrounding air as heat. Capacitor bank 15 then stands ready to absorb energy from a subsequent surge voltage on bus line 11.

It will therefore be seen that I have provided a surge limiting device effective to limit surge voltage on a bus line to which it is connected to a reasonable predetermined value above normal line-to-ground voltage on the bus line, thereby permitting provision of BIL for the bus line and equipment connected thereto less than the BIL heretofore required therefor while maintaining a protection ratio for the same as good as or better than that heretofore afforded thereto, so that the cost of the bus line and equipment connected thereto may be reduced and the efficiency thereof increased.

In the drawings and specification there has been set forth a preferred embodiment of the invention and, although specific terms are employed, they are used in a generic and descriptive sense only and not for purposes of limitation.

I claim:

1. The combination with an electrical power transmission system including a bus line having a normal line-to-ground AC voltage impressed thereon and a bank of power factor correction capacitors connected to said bus line of a surge limiting device protecting said power factor correction capacitors and comprising
    (a) a bank of energy absorbing capacitors connected to ground and having an electrical energy absorptive capacity correlated to the maximum electrical energy of a surge which may expectedly appear on the bus line, and
    (b) means connected to said bank of energy absorbing capacitors and adapted to be connected to the bus line and being responsive to an increase in voltage on the bus line to a surge voltage of a predetermined value above the normal voltage thereon for connecting said bank of energy absorbing capacitors to the bus line, whereby said bank of energy absorbing capacitors absorbs the electrical energy from the surge voltage on the bus line and thereby limits the maximum value of the surge voltage to substantially said predetermined value.

2. Apparatus as in claim 1 wherein said means (b) for connecting said bank of capacitors (a) to the bus line includes means defining a vacuum arc gap calibrated to have a voltage spark-over setting corresponding to a surge voltage of said predetermined value.

3. Apparatus according to claim 2, wherein said means defining said vacuum arc gap comprises
    (1) a hollow air-tight housing from which a substantial portion of air has been evacuated,
    (2) a first electrode penetrating one end portion of said housing and terminating in an electrode inner end portion within said housing,
    (3) resilient means mounting said first electrode on said one end portion of said housing for resilient movement relative thereto while preserving the airtightness of said housing,
    (4) a second electrode electrically insulated from said first electrode and penetrating a second end portion of said housing opposed to said one end portion thereof, and terminating in an electrode inner end portion within said housing adjacent to and spaced from the electrode inner end portion of said first electrode by a distance correlated to said voltage spark-over setting of said vacuum arc gap, and
    (5) adjustable mounting means adjustably mounting said first electrode on said first end portion of said housing in adjustable spaced relation to said second electrode, whereby the voltage spark-over setting of said vacuum arc gap may be calibrated.

4. Apparatus according to claim 1, wherein said means (b) for connecting said bank of energy absorbing capacitors (a) to the bus line includes
    (1) means defining a vacuum arc gap calibrated to have a voltage spark-over setting corresponding to a surge voltage of said predetermined value, and
    (2) means defining at least one trigger arc gap connected in series with said vacuum arc gap between the bus line and said vacuum arc gap, and connected in parallel shunting relation with a proportionate part of said bank of power factor correction capacitors (c) so that the voltage on the bus line impresses a voltage across said trigger arc gap correspondingly proportioned to the line-to-ground voltage on the bus line, said trigger arc gap being calibrated to have a voltage spark-over setting corresponding to the value of a voltage impressed thereacross by a surge voltage on the bus line of said predetermined value.

5. Apparatus according to claim 4, wherein said means (b) for connecting said first bank of capacitors (a) to the bus line includes
    (3) means defining a second trigger arc gap connected in series with said first trigger arc gap between the same and said vacuum arc gap and connected in parallel shunting relation with a proportionate part of said second bank of capacitors about double that proportionate part thereof connected in parallel with said first trigger arc gap and inclusive thereof, said second trigger arc gap being calibrated to have a voltage spark-over setting higher than but less than double the voltage spark-over setting of said first trigger arc gap.

6. Apparatus according to claim 5 including
(d) at least one coupling capacitor having one side thereof connected to said arc gaps between an adjacent pair thereof, and the other side thereof connected to said second bank of capacitors (c) between an adjacent pair of capacitors therein for stabilizing the voltage spark-over value of each arc gap of said adjacent pair of arc gaps.

7. Apparatus according to claim 6, including
(e) a damping resistor connected in series with said coupling capacitor (d) between the same and one of its connections, for damping voltage oscillations between said arc gaps and said second bank of capacitors (c).

8. A surge limiting device for use in an electrical power transmission system including a bus line having a normal line-to-ground AC voltage impressed thereon and a bank of power factor correction capacitors connected to said bus line and protected by said surge limiting device, said surge limiting device comprising
(a) a bank of energy absorbing capacitors connected to ground and having an electrical energy absorptive capacity correlated to the maximum electrical energy of a surge which may expectedly appear on the bus line, and
(b) means including a non-ionizing arc gap means connected to said bank of energy absorbing capacitors and adapted to be connected to the bus line, said arc gap means being calibrated to have a predetermined voltage spark-over setting above the normal voltage impressed on said bus line and responsive to an increase of voltage on the bus line to a surge voltage of at least the spark-over setting value for connecting said bank of energy absorbing capacitors to said bus line on spark-over of said non-ionizing arc gap means, whereby said bank of energy absorbing capacitors absorbs electrical energy from the surge voltage on the bus line and thereby limits the maximum value of the surge voltage.

9. Apparatus according to claim 8, including
(c) at least one resistor connected in parallel with said bank of capacitors to aid in absorbing the electrical energy of the surge voltage and to dissipate the electrical energy absorbed by said bank of capacitors from the surge after the voltage on the bus line has returned to a value less than said predetermined value.

10. Apparatus according to claim 8 wherein said bank of capacitors (a) comprises a plurality of strings of capacitors connected in series within each string, and all said strings being connected in parallel with each other.

References Cited

UNITED STATES PATENTS

| | | | |
|---|---|---|---|
| 3,255,382 | 6/1966 | Wolf | 317—12 |
| 3,260,895 | 7/1966 | Buffa et al. | 317—12 |
| 3,274,445 | 9/1966 | Wolf | 317—12 |

JOHN F. COUCH, Primary Examiner

R. V. LUPO, Assistant Examiner